United States Patent [19]

George

[11] Patent Number: 5,115,003
[45] Date of Patent: May 19, 1992

[54] STABILIZED POLYKETONE COMPOSITIONS CONTAINING A MIXTURE OF A HYDROXYAPATITE AND A MERCAPTOBENZIMIDAZOLE

[75] Inventor: Eric R. George, Houston, Tex.

[73] Assignee: Shell Oil Company, Houston, Tex.

[21] Appl. No.: 703,067

[22] Filed: May 20, 1991

[51] Int. Cl.$^5$ .................... C08K 3/32; C08K 5/3445
[52] U.S. Cl. .................... 524/93; 524/414; 524/415; 524/417
[58] Field of Search ............ 524/414, 415, 417, 706, 524/93

[56] References Cited

U.S. PATENT DOCUMENTS

| | | | |
|---|---|---|---|
| 2,493,597 | 1/1950 | Rothrock, Jr. | 260/45.7 |
| 2,495,286 | 1/1950 | Brubaker | 260/63 |
| 2,630,421 | 3/1953 | Stamatoff | 260/45.8 |
| 2,640,044 | 5/1953 | Stamatoff | 260/45.7 |
| 2,705,227 | 3/1955 | Stamatoff | 260/45.7 |
| 2,984,647 | 5/1961 | White | 260/45.75 |
| 3,694,412 | 9/1972 | Nozaki | 260/63 |
| 3,984,850 | 4/1976 | Hudgin | 260/45.7 |
| 4,594,382 | 6/1986 | Hoenig | 524/400 |
| 4,746,686 | 5/1988 | Waller | 522/14 |
| 4,761,448 | 8/1988 | Kluttz et al. | 524/381 |
| 4,843,144 | 6/1989 | Van Broekhoven et al. | 528/392 |
| 4,880,903 | 11/1989 | Van Broekhoven et al. | 528/392 |
| 4,937,279 | 6/1990 | Betso et al. | 524/417 |
| 5,021,496 | 6/1991 | Machado et al. | 524/417 |

FOREIGN PATENT DOCUMENTS 57-109848 12/1980 Japan .
1081304 2/1966 United Kingdom .

OTHER PUBLICATIONS

H. H. G. Jellinek, "Degradation and Stabilization of Polymers", Clarkson Coll. of Technology, N.Y., 1983, p. 211.

Primary Examiner—Paul R. Michl
Assistant Examiner—Tae H. Yoon
Attorney, Agent, or Firm—Denise Y. Wolfs

[57] ABSTRACT

Polymer compositions comprising a linear alternating polymer of carbon monoxide and at least one ethylenically unsaturated hydrocarbon which contain a stabilizing mixture of a hydroxyapatite and a mercaptobenzimidazole demonstrate improved stability.

18 Claims, No Drawings

STABILIZED POLYKETONE COMPOSITIONS CONTAINING A MIXTURE OF A HYDROXYAPATITE AND A MERCAPTOBENZIMIDAZOLE

FIELD OF THE INVENTION

This invention relates to polyketone polymers, and, more particularly, to compositions of a polyketone polymer stabilized with a mixture of calcium hydroxyapatite and a mercaptobenzimidazole.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content polymerized in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6, and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods.

SUMMARY OF THE INVENTION

The present invention provides certain stabilized polymeric compositions of linear alternating polymers of carbon monoxide and at least one ethylenically unsaturated hydrocarbon, and a process for the production of such stabilized compositions. The compositions are stabilized with a mixture of hydroxyapatite and mercaptobenzimidazole. The hydroxyapatite is of the formula $M_{10}(PO_4)_6(OH)_2$, where M is barium (Ba), strontium (Sr), or calcium (Ca). The mercaptobenzimidazole is preferably a 2-mercaptobenzimidazole. More particularly, the invention provides compositions comprising the linear alternating polymer having a stabilizing mixture of calcium hydroxyapatite and mercaptobenzimidazole incorporated therein. The resulting compositions demonstrate improved stability upon being subjected to thermal aging conditions.

DESCRIPTION OF THE INVENTION

It is an object of this invention to stabilize the polyketone polymers such that their properties do not deteriorate during thermal aging encountered during the life of a molded part. This object is realized by adding a stabilizing mixture to the polyketone polymer. The stabilized compositions of the invention comprise an intimate mixture of the linear alternating polyketone polymer with a stabilizing mixture of a hydroxyapatite and a mercaptobenzimidazole. Other objects will be apparent from the description of the invention.

The polyketone polymers of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

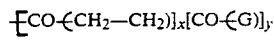

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(CH$_2$CH$_2$)— units and the —CO—(G)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144 (Van Broekhoven et al.). The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[-di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

Polymers employed in a variety of applications may exhibit a decline in physical properties over time due to oxidative and/or thermal degradation. To minimize the effects of this natural aging, stabilizers are added to the neat polymer. Hindered phenols, for example, are frequently used as oxidative or thermal stabilizers for a variety of polymers. A variety of other materials have also demonstrated a stabilizing effect in one or more polymers.

The polyketone polymers of the subject invention are stabilized with a mixture of a hydroxyapatite and a mercaptobenzimidazole.

The hydroxyapatite component of the stabilizing mixture is of the formula $M_{10}(PO_4)_6(OH)_2$, where M is barium (Ba), strontium (Sr), or calcium (Ca). The preferred hydroxyapatite is calcium hydroxyapatite, $Ca_{10}(PO_4)_6(OH)_2$, a naturally occurring calcium phosphate and the major constituent of bone and tooth mineral. It is a finely divided, crystalline, non-stoichiometric material rich in surface ions which are readily replaced by fluoride ions. Calcium hydroxyapatite is also referred to as tribasic calcium phosphate.

Hydroxyapatites are known as additives for polymer compositions. U.S. Pat. No. 4,937,279 (Betso et al.) discloses that the addition of an alkaline-earth hydroxyphosphate to a vinylidene chloride polymer improves the extrudability of the polymer. Japan 57-109,848 discloses the addition of a hydroxyapatite along with an inhibitor to a polyolefin polymer to improve thermal and ultraviolet light stability.

The mercaptobenzimidazole component of the stabilizing mixture may be represented by the formula for 2-mercaptobenzimidazoles:

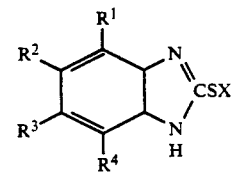

wherein each of $R^1$, $R^2$, $R^3$, and $R^4$ is independently a hydrogen atom or a lower alkyl group of from one to four carbon atoms, and X is a hydrogen atom, an alkali metal, or ammonium. A tautomer of the above formula is also suitable. Particularly preferred are 2-mercaptobenzimidazole, wherein $R^1$, $R^2$, $R^3$, $R^4$, and X are each H; and methyl-2-mercaptobenzimidazole, wherein at least one of $R^1$, $R^2$, $R^3$, or $R^4$ are methyl, and X is H.

Mercaptobenzimidazoles are also known as additives for polymer compositions. U.S. Pat. No. 2,630,421 (Stamatoff) discloses the use of 2-mercaptobenzimidazole as a thermal stabilizer for polyamides, preferably in combination with an acidic phosphorous compound.

The mixture of hydroxyapatite and mercaptobenzimidazole is employed in a stabilizing quantity for the polyketone polymer. The specific amount of stabilizing mixture present, and the relative proportions of the two components of the mixture, in the compositions of the invention is not critical, as long as a stabilizing quantity is present and other important polymer properties for the intended use are not adversely affected. The precise amount of each component required for melt stabilization will depend upon a variety of factors, such as the melt temperature, the polymer's LVN, and the interactive effects of other additives and impurities present.

The hydroxyapatite is provided in an amount from about 0.001 wt % to about 5 wt % or more hydroxyapatite, based on the weight of polymer to be stabilized. Compositions containing from about 0.01 wt % to about 1.0 wt % hydroxyapatite, on the same basis, are believed to exhibit desirable melt stability, while compositions containing from about 0.01 wt % to about 0.5 wt % hydroxyapatite are preferred for a wide variety of uses.

The mercaptobenzimidazole is provided in an amount of from about 0.001 wt % to about 0.10 wt %, based on the weight of polymer to be stabilized. Compositions containing from about 0.001 wt % to about 0.05 wt % mercaptobenzimidazole on the same basis are preferred.

It is within the scope of the present invention to use quantities of the components of the present stabilizing mixture outside of the ranges herein specified; but it is expected that amounts substantially less than the minimum quantities are usually ineffectual, and quantities above the maximum amounts either cause no further improvement in the polymer or negatively affect melt processability.

While not wishing to be bound by any theory, the mercaptobenzimidazole is believed to function as an antioxidant by deactivating peroxy radicals. The hydroxyapatite functions as both a melt stabilizer and a thermal stabilizer, and may play a role in mitigating the effect of impurities present in the polymer.

The types and amounts of impurities present may determine the optimum ratio of hydroxyapatite to mercaptobenzimidazole. One skilled in the art, without undue experimentation, will be able to determine the optimum ratio for specific applications.

The hydroxyapatite and mercaptobenzimidazole components of the stabilizing mixture are added to the polyketone polymer by any method suitable for forming an intimate mixture of the polymer and stabilizers. Such methods include dry blending of the polymer and stabilizers in a finely divided form, followed by hot pressing or extrusion of the mixture. The composition may also be produced by blending the components in a melt mixing device. The stabilizer components are preferably added to the polymer at the same time, but satisfactory results are obtained when the components are added separately.

The compositions of the invention may also include other additives such as antioxidants, dyes, fillers or reinforcing agents, fire resistant materials, mold release agents, colorants and other materials designed to improve the processability of the polymers or the properties of the resulting blend. Such additives are added prior to, together with, or subsequent to the blending of the polyketone and stabilizers. The presence of these additives may affect the optimum level of stabilizers for a given application.

The compositions are processed by methods such as extrusion and injection molding into sheets, films, plates and shaped parts. Illustrative of such applications are the production of articles useful in both rigid and flexible packaging applications, such as containers and films, and in both internal and external parts for automotive use; fibers useful in yarns, tire cord, and fabric; and coatings for a variety of materials.

The invention is further illustrated by the following Examples which should not be regarded as limiting.

EXAMPLE 1

A linear alternating terpolymer of carbon monoxide, ethylene, and propylene (89/071) was produced in the presence of a catalyst composition formed from palladium acetate, trifluoroacetic acid and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained 0.5% Ethanox 330 and 0.5% Nucrel 535.

EXAMPLE 2

A portion of the polymer of Example 1 was ground to 60 mesh, and then powder-mixed with calcium hydroxyapatite (with a theoretical mole ratio of 1.67 Ca:P) and/or 2-mercaptobenzimidazole in a Henschel mixer for 5 minutes. Samples containing various concentrations of calcium hydroxyapatite and/or 2-mercaptobenzimidazole were prepared, as shown in Table 1. The samples were compounded in a ⅜ in. Braebender single screw extruder, operating at 60 to 100 rpm with melt temperatures between 230° and 250° C. The viscosity of each sample was determined over time in the melt in a Rheometrics parallel plate rheometer operated at 275° C. Table 1 lists the initial melt viscosity and the viscosity after 10 minutes. During commercial processing, polymers are typically in a melt phase for less than 10 minutes.

TABLE 1

| Calcium Hydroxyapatite (wt %) | 2-Mercapto-benzimidazole (wt %) | Viscosity (Pa.-sec.) | |
|---|---|---|---|
| | | 0 min | 10 min |
| 0 | 0 | 900 | 6500 |
| 0.004 | 0 | 800 | 3300 |
| 0.041 | 0 | 800 | 3600 |
| 0.25 | 0 | 965 | 3437 |
| 0 | 0.005 | 1400 | 5400 |
| 0 | 0.045 | 1300 | 7200 |
| 0.004 | 0.005 | 1300 | 6300 |
| 0.041 | 0.045 | 1000 | 6800 |
| 0.25 | 1.00 | 1000 | 24,000 |
| 1.0 | 1.00 | 1100 | 29,000 |

For the combinations, lower concentrations of the calcium hydroxyapatite, of from about 0.004 wt % to about 0.04 wt %, combined with lower concentrations of 2-mercaptobenzimidazole, of from about 0.005 wt % to about 0.05 wt %, at about a 1:1 mole ratio, exhibit acceptable processability. The total wt % of the combined stabilizers is less than 0.10, indicating their effectiveness at low concentrations.

EXAMPLE 3

The samples described in Example 2 were formed into plaques for thermal stability testing. The samples were compression molded on a 100 ton press operating at 250° C. into sample plaque that were 0.03 in. thick.

The sample plaques were placed in an oven maintained at 125° C. Periodically, sample plaques were withdrawn and bent across an angle of 180 degrees (i.e. folded in half). When a sample plaque cracked, failure occurred, and the time to embrittlement was determined as a function of time. The results of these oven-aging tests are shown in Table 2.

TABLE 2

| Calcium Hydroxyapatite (wt %) | 2-Mercapto-benzimidazole (wt %) | Oven Life (Days) |
|---|---|---|
| 0 | 0 | 9 |
| 0.004 | 0 | 9 |
| 0.041 | 0 | 9 |
| 0.25 | 0 | 9 |
| 0 | 0.005 | 9 |
| 0 | 0.045 | 9 |
| 0.004 | 0.005 | 12 |
| 0.041 | 0.045 | 12 |
| 0.25 | 1.00 | 19 |
| 1.0 | 1.0 | 18 |

The data demonstrate that low concentrations of either calcium hydroxyapatite or 2-mercaptobenzimidazole alone have little or no effect on the oven life of the polyketone polymer. However, combinations of the two, particularly at higher concentrations, provided a significant increase in the oven life of the neat polymer.

These oven life results must be balanced against the melt viscosity data. The combinations of lower concentrations of calcium hydroxyapatite (0.004–0.041 wt %) and 2-mercaptobenzimidazole (0.005–0.045 wt %) provided both increased oven life and acceptable melt viscosity.

EXAMPLE 4

For comparison, a portion of the polymer of Example 1 was combined with 2-mercaptobenzimidazole and two other components (not of the invention), phosphorous acid and potassium bromide. Four samples were prepared:

(1) 1.0 wt % 2-mercaptobenzimidazole;
(2) 0.25 wt % phosphorous acid:
(3) 1.0 wt % 2-mercaptobenzimidazole plus 0.25 wt % phosphorous acid; and
(4) 0.25 wt % phosphorous acid plus 1.0 wt % potassium bromide.

When heated, all four samples exhibited severe crosslinking, and could not be analyzed for melt rheology. Consequently, these four additive combinations were demonstrated to be unacceptable stabilizers for the polyketone polymer.

The results above demonstrate that calcium hydroxyapatite and 2-mercaptobenzimidazole, when added to the polyketone polymer in combination at low levels, can provide a polymer with a good balance of melt viscosity and oven life.

What is claimed is:

1. A stabilized polymer composition comprising:
a linear alternating polymer of carbon monoxide and at least one ethylenically unsaturated hydrocarbon; and
a mixture of a 2-mercaptobenzimidazole and calcium hydroxyapatite or tribasic calcium phosphate, wherein the mixture is present in the composition in a stabilizing amount.

2. The composition of claim 1 wherein the polymer is of the repeating formula

wherein G is a moiety of an ethylenically unsaturated hydrocarbon of at least 3 carbon atoms, polymerized through the ethylenic unsaturation, and the ratio of y:x is no more than about 0.5.

3. The composition of claim 2 wherein the 2-mercaptobenzimidazole is 2-2-mercaptobenzimidazole.

4. The composition of claim 3 wherein y is 0.

5. The composition of claim 3 wherein the ratio of y:x is from 0.01 to about 0.1.

6. The composition of claim 5 wherein G is a moiety of propylene.

7. The composition of claim 3 wherein the calcium hydroxyapatite or tribasic calcium phosphate is present in a quantity of from about 0.001 wt %, to about 5 wt %, based on total composition, and the 2-mercaptobenzimidazole is present in a quantity of from about 0.001 wt % to about 0.10 wt %, based on total composition.

8. A composition stabilized against aging which comprises a linear alternating polymer of carbon monoxide and at least one ethylenically unsaturated hydrocarbon having incorporated therein a stabilizing quantity of a mixture of a 2-mercaptobenzimidazole and calcium hydroxyapatite or tribasic calcium phosphate.

9. The composition of claim 8 wherein the polymer is of the repeating formula

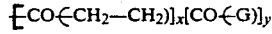

wherein G is a moiety of an ethylenically unsaturated hydrocarbon of at least 3 carbon atoms, polymerized through the ethylenic unsaturation, and the ratio of y:x is no more than about 0.5.

10. The composition of claim 8 wherein the 2-mercaptobenzimidazole is 2-2-mercaptobenzimidazole.

11. The composition of claim 10 wherein y is 0.

12. The composition of claim 8 wherein the ratio of y:x is from 0.01 to about 0.1.

13. The composition of claim 10 wherein G is a moiety of propylene.

14. The composition of claim 11 wherein the calcium hydroxyapatite or tribasic calcium phosphate is present in a quantity of from about 0.001 wt % to about 5 wt %, based on total composition, and the 2-mercaptobenzimidazole is present in a quantity of from about 0.001 wt % to about 0.10 wt %, based on total composition.

15. A method of stabilizing a linear alternating polymer of carbon monoxide and at least one ethylenically unsaturated hydrocarbon by incorporating therein a stabilizing mixture of a 2-mercaptobenzimidazole and calcium hydroxyapatite or tribasic calcium phosphate.

16. The method of claim 13 wherein the polymer is of the repeating formula

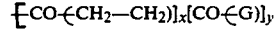

wherein G is a moiety of an ethylenically unsaturated hydrocarbon of at least 3 carbon atoms polymerized through the ethylenic unsaturation, and the ratio of y:x is no more than about 0.5.

17. The method of claim 16 wherein the 2-mercaptobenzimidazole is 2-2-mercaptobenzimidazole.

18. The method of claim 13 wherein y is 0.

* * * * *